United States Patent [19]

Hsu

[11] Patent Number: 6,050,312

[45] Date of Patent: Apr. 18, 2000

[54] INNER TUBE WITH MULTIPLE AIR CELLS AND BREAKERS FOR PROTECTION AGAINST PIERCING OF AN EXTERNAL POINTED OBJECT

[76] Inventor: Shut Chen Hsu, No. 7, Alley 1, Lane 163, Sec. 3, Nung-Chuan Rd., I Lan, Taiwan

[21] Appl. No.: 09/165,740

[22] Filed: Oct. 5, 1998

[51] Int. Cl.[7] ..................................................... B60C 5/04
[52] U.S. Cl. ...................... 152/157; 152/159; 152/162; 152/195; 152/317; 152/333.1; 152/336.1; 152/512
[58] Field of Search ..................................... 152/157, 158, 152/195, 313, 317, 315, 318–322, 511, 512, 336.1, 333.1, 161, 162, 159, 165, 166, 203, 204, 506, 507

[56] References Cited

U.S. PATENT DOCUMENTS 466,548  1/1892  Woodward ............................ 152/333.1
1,415,140  5/1922  Beckman ................................ 152/317
3,256,123  6/1966  Hart ........................................ 152/317

Primary Examiner—Geoffrey L. Knable
Attorney, Agent, or Firm—Rosenberg, Klein & Lee

[57] ABSTRACT

An inner tube for a vehicle tire, including a base, the base having two outer walls, two inner walls, an annular air chamber connected between the inner walls, and a plurality of rubber coated breakers retained between the inner walls and the outer walls and arranged in a zigzag manner around the axial central axis of the base, and a multi-cell tube mounted around the annular master air chamber between the inner walls of the base, the multi-cell tube having arched cells of different sizes arranged around its center, a plurality of foamed rubber blocks and a plurality of glued breakers alternatively plugged into the arched cells, and a layer of patching agent covered over the arched cells to seal the foamed rubber blocks and the glued breakers in the arched cells.

3 Claims, 4 Drawing Sheets

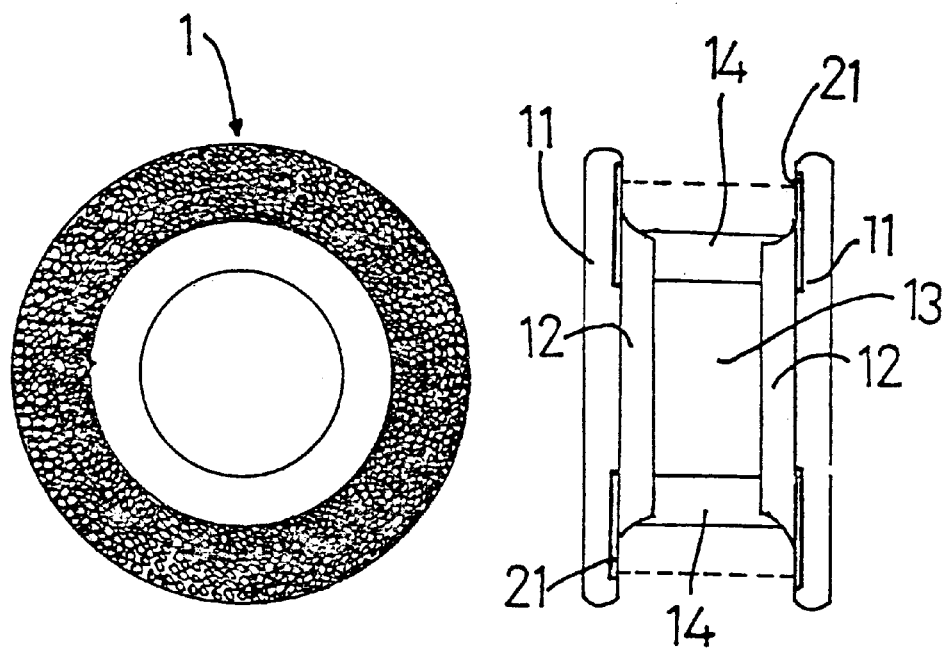
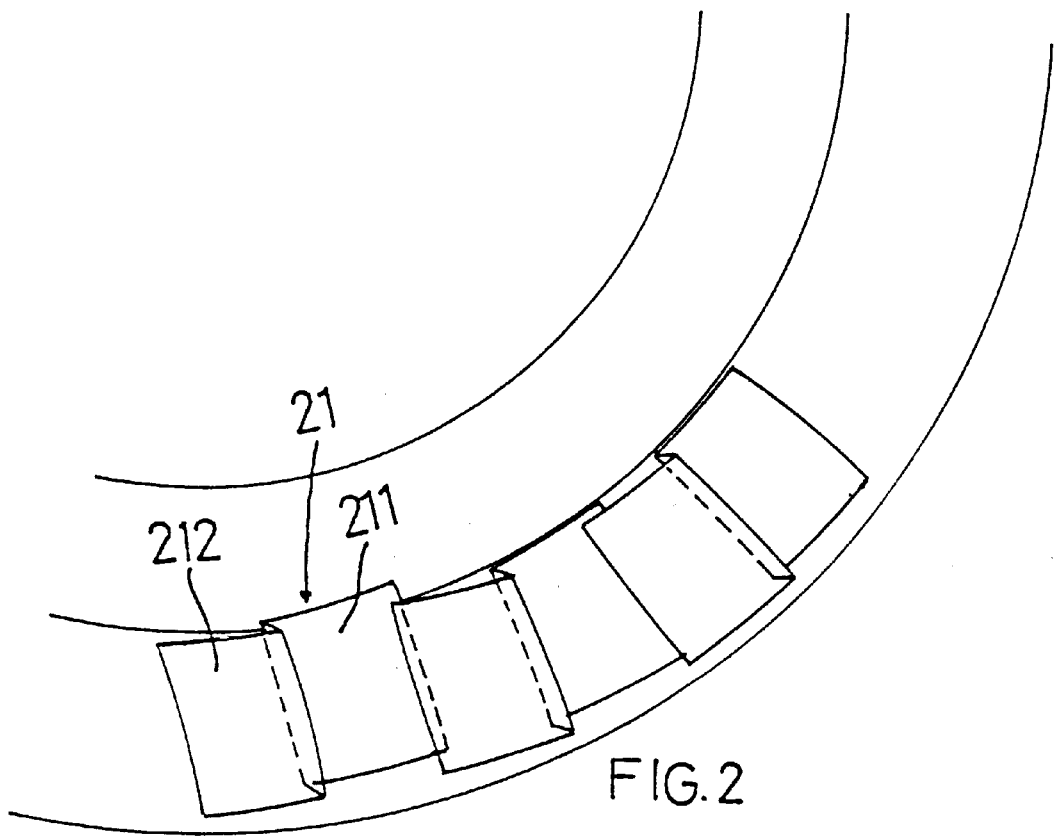

INNER TUBE WITH MULTIPLE AIR CELLS AND BREAKERS FOR PROTECTION AGAINST PIERCING OF AN EXTERNAL POINTED OBJECT

BACKGROUND OF THE INVENTION

The present invention relates to vehicle tires and more particularly to an inner tube for a vehicle tire which has multiple air cells and breakers.

Regular motorcycle and automobile tires do not have an inner tube. When an external pointed object pierces the tire of a motor vehicle, air does not immediately leak out. However, if the motor vehicle keeps running for a certain length of time after piercing of an external pointed object through one tire thereof, the tire may explode, causing a catastrophe.

SUMMARY OF THE INVENTION

It is the main object of the present invention to provide an inner tube for a vehicle tire which has means for protection against piercing of an external pointed object. It is another object of the present invention to provide an inner tube for a vehicle tire which is replaceable, and convenient for a repair work. According to the invention, the inner tube comprises a base, which is made by fastening rubber air balls into shape, and a multi-cell tube mounted on the base. The base comprises two opposite outer walls arranged in parallel, two opposite inner walls respectively connected to the outer walls at an inner side, an annular master air chamber connected between the inner walls, a circular center through hole defined within the annular master air chamber, and a plurality of rubber coated breakers fastened to the inside of the outer walls and arranged in a zigzag manner and retained between the outer walls and the inner walls. The multi-cell tube comprises a plurality of big arched cells and a plurality of small arched cells alternatively arranged around the center thereof, a plurality of rubber blocks respectively made by fastening rubber air balls together and coated with a glue and plugged into the big arched cells, a plurality of glued breakers respectively plugged into the small arched cells and a layer of patching agent covered over the big arched cells and the small arched cells to seal the foamed rubber blocks and the glued breakers in the big arched cells and the small arched cells. Because the master air chamber is protected within the multi-cell rubber tube, piercing of an external pointed object through the multi-cell rubber tube does not cause the inner tube to explode. When the external pointed object which pierces the inner tube is taken away, the patching agent is compressed by air pressure to seal the gap.

BRIEF DESCRIPTION OF THE DRAWINGS

FIG. 1 shows the outer appearance and structure of a base for an inner tube according to the present invention.

FIG. 2 is a schematic drawing showing the breakers arranged in a zigzag manner inside the inner wall of the base according to the present invention.

DETAILED DESCRIPTION OF THE PREFERRED EMBODIMENT

Figure 3:
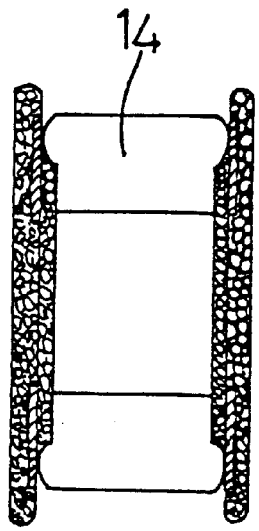
FIG. 3 illustrates the master air chamber of the base inflated according to the present invention.

Referring to FIG. 1, a base 1 for an inner tube is shown made of rubber air balls fastened together and comprised of two opposite outer walls 11 arranged in parallel, two opposite inner walls 12 respectively connected to the outer walls 11 at an inner side, an annular master air chamber 14 connected between the outer walls 11 around the inner walls 12, a circular center through hole 13 defined within the annular master air chamber 14, and a plurality of rubber coated breakers 21 fastened to the inside of the outer walls 11 and retained between the outer walls 11 and the inner walls 12.

Referring to FIG. 2, the rubber coated breakers 21 are arranged in a zigzag manner in between the outer walls 11 and the inner walls 12. The rubber coated breakers 21 include lower breakers 211 and upper breakers 212. Each lower breaker 211 has two sides covered by adjacent upper breakers 212.

Referring to FIG. 3 and FIG. 1 again, when the annular master air chamber 14 is inflated, the outer walls 11 and the inner walls 12 are compressed, and the breakers 21 are firmly retained in between the outer walls 11 and the inner walls 12.

Figure 4:
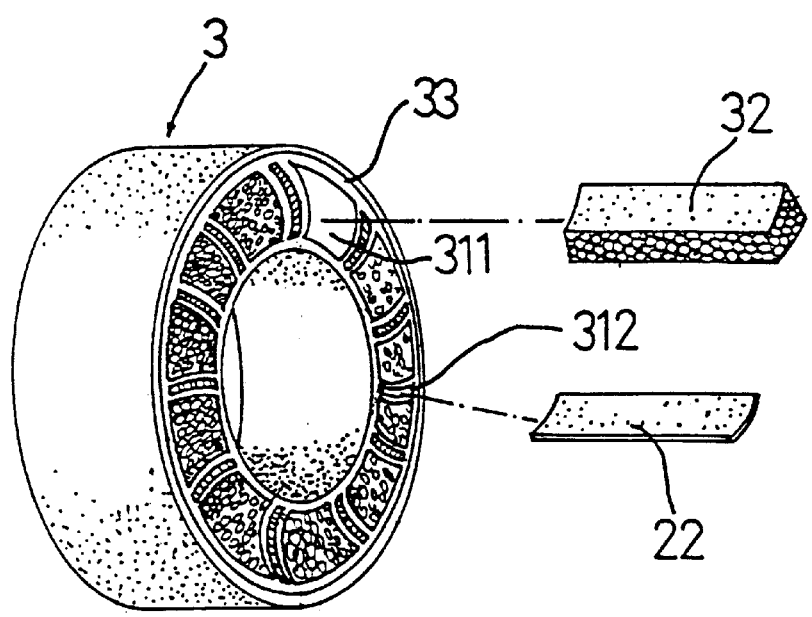
FIG. 4 is an exploded view of a multi-cell rubber tube for an inner tube according to the present invention.
Figure 5:
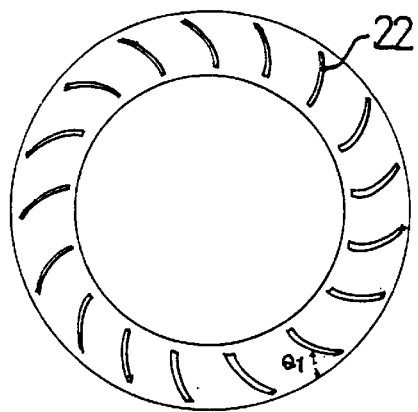
FIG. 5 shows a status of the multi-cell rubber tube before compression according to the present invention.
Figure 6:
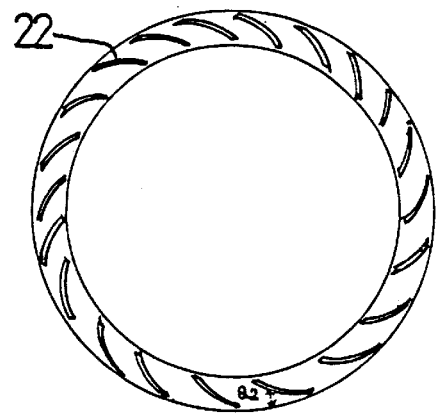
FIG. 6 shows a status of the multi-cell rubber tube after compression according to the present invention.

Referring to FIGS. 4, 5 and 6, a multi-cell rubber tube 3 is shown having a plurality of big arched cells 311 and a plurality of small arched cells 312 alternatively arranged around the center through hole thereof, a plurality of rubber blocks 32 respectively made by fastening rubber air balls together and then coated with a glue and plugged into the big arched cells 311, a plurality of glued breakers 22 respectively plugged into the small arched cells 312, and a layer of patching agent 33 covered over the arched cells 311,312 to seal the rubber blocks 32 and the glued breakers 22 inside the cells 311,312. FIG. 5 shows a status of the multiple cell rubber tube 3 before compression. FIG. 6 shows a status of the multi-cell rubber tube 3 after compression. When compressed, the wall thickness of the multi-cell rubber tube 3 becomes thinner, the rubber blocks 32 are compressed and deformed, and the contained angle θ2 between the breakers 22 and the periphery of the multi-cell rubber tube 3 shown in FIG. 6 is relatively smaller than the contained angle θ1 between the breakers 22 and the periphery of the multi-cell rubber tube 3 shown in FIG. 5.

Figure 7:
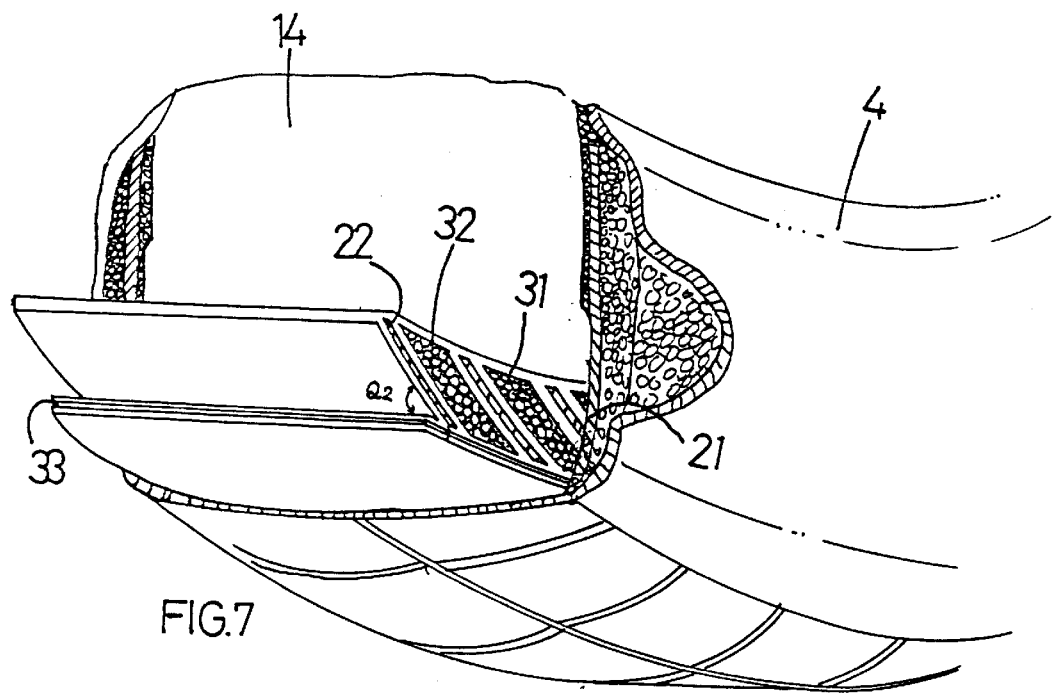
FIG. 7 is a cutaway of an inner tube for a vehicle tire according to the present invention.
Figure 8:
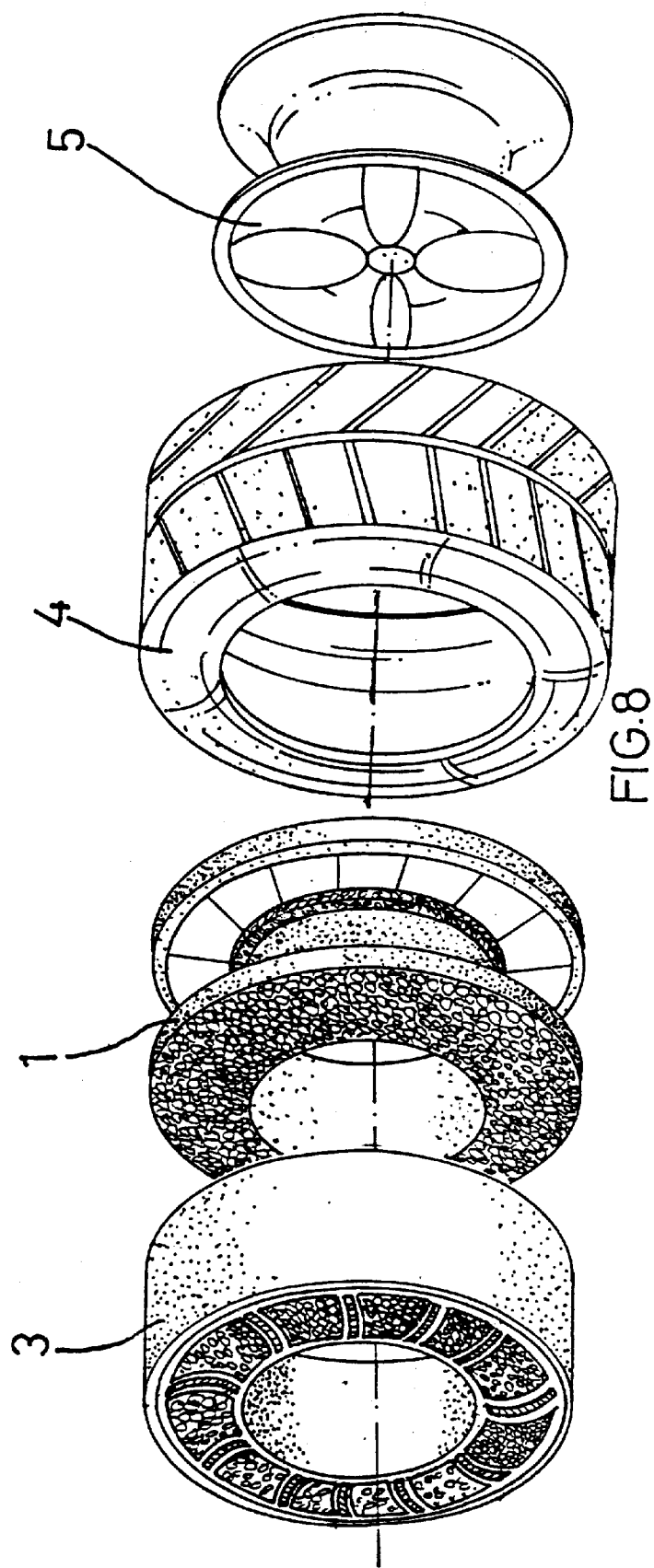
FIG. 8 is an exploded view showing the installation of the present invention in a vehicle tire.

Referring to FIGS. 7 and 8, the multiple cell rubber tube 3 is mounted around the annular master air chamber 14 of the base 1, forming with the base 1 an inner tube. The inner tube is then fastened to a wheel (rim) 5, and covered within an outer tire 4.

What the invention claimed is:

1. An inner tube for a vehicle tire, comprising:

a base made of rubber air balls, said base comprising two opposite outer walls arranged in parallel, two opposite inner walls respectively connected to said outer walls at an inner side, an annular master air chamber connected between said inner walls, a circular center through hole defined within said annular master air chamber, and a plurality of rubber coated breakers fastened to the inside of said outer walls and arranged in a zigzag manner and retained between said outer walls and said inner walls; and a multi-cell tube mounted on said base around said annular master air chamber between said inner walls, said multi-cell tube comprising a plurality of big arched cells and a plurality of small arched cells alternatively arranged around the center thereof, a plurality of rubber blocks respectively made by fastening rubber air balls together and coated with a glue and plugged into said big arched cells, a plurality of glued breakers respectively plugged into said small arched cells, and a layer of patching agent covered over said big arched cells and said small arched cells to seal said rubber blocks and said glued breakers in said big arched cells and said small arched cells.

2. The inner tube of claim 1 wherein the breakers of said base and the breakers of said multi-cell tube are made of metal material.

3. The inner tube of claim 1 wherein the breakers of said base and the breakers of said multi-cell tube are made of non-metal material.

* * * * *